June 29, 1937.　　　C. B. SCHMIDT　　　2,085,275
AUTOMOBILE CURRENT SUPPLY SYSTEM
Filed May 14, 1935　　　2 Sheets-Sheet 1
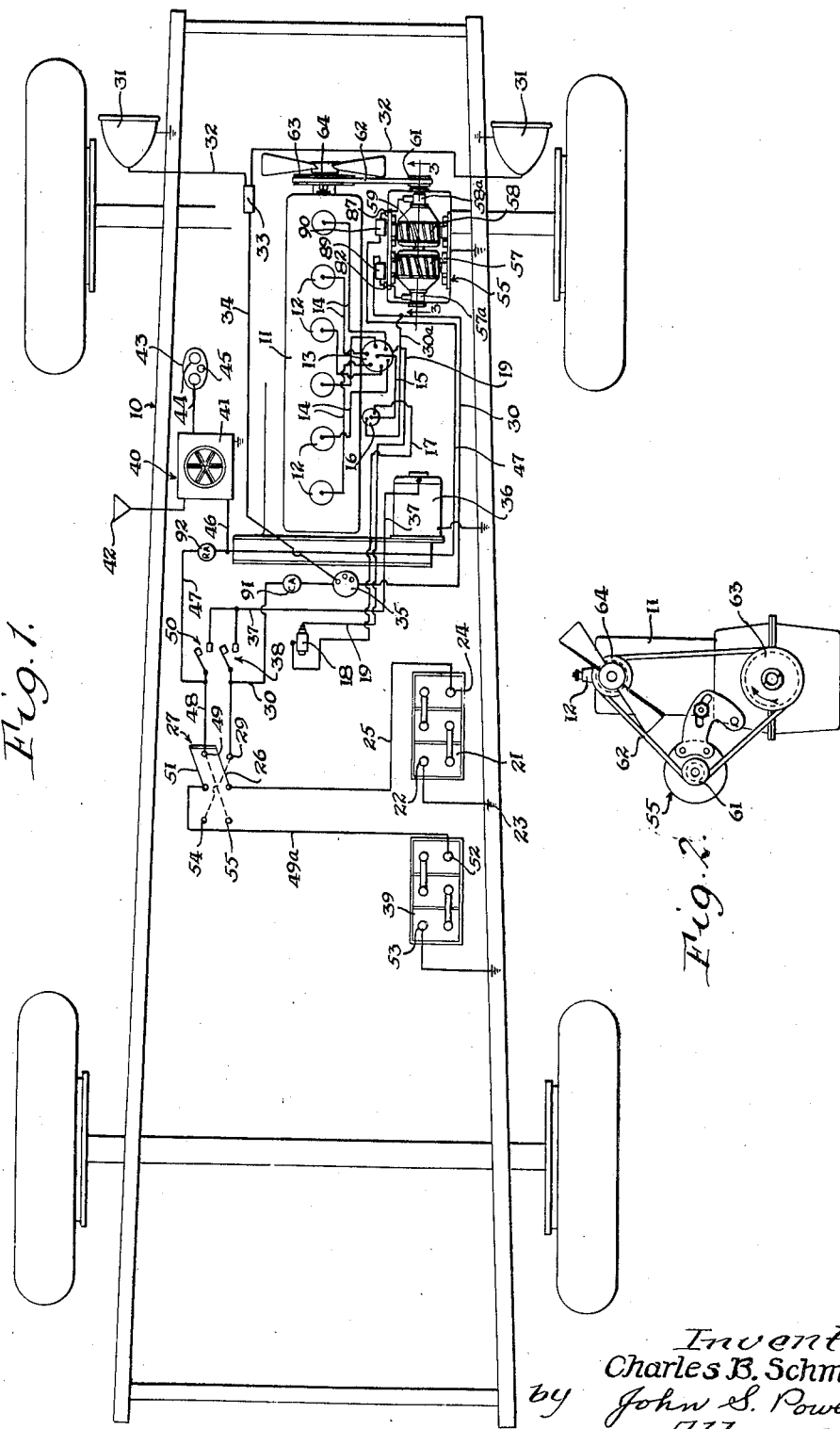
Inventor
Charles B. Schmidt
by John S. Powers
Attorney June 29, 1937.  C. B. SCHMIDT  2,085,275
AUTOMOBILE CURRENT SUPPLY SYSTEM
Filed May 14, 1935  2 Sheets-Sheet 2
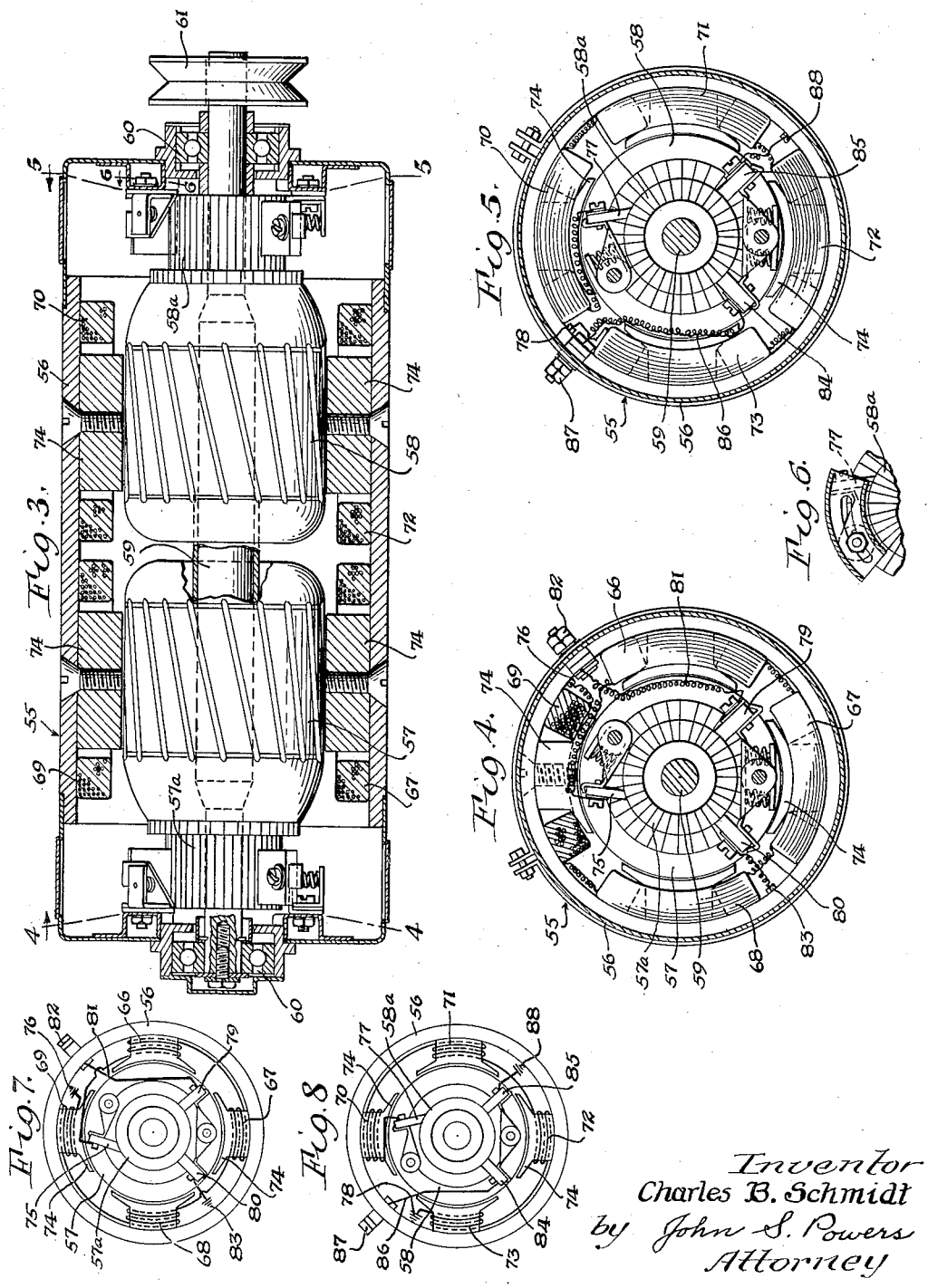
Inventor
Charles B. Schmidt
by John S. Powers
Attorney Patented June 29, 1937

2,085,275

UNITED STATES PATENT OFFICE 2,085,275

AUTOMOBILE CURRENT SUPPLY SYSTEM

Charles B. Schmidt, Buffalo, N. Y.

Application May 14, 1935, Serial No. 21,393

1 Claim. (Cl. 290—36)

This invention relates to an electric current supply system which, although available for other purposes, is of particular utility as a means for providing the electric current required in the operation of an automobile and the associated electrical devices. The invention contemplates a system having current generating means and main and secondary batteries which are charged thereby and which are available as independent sources of power, one of the said batteries being adapted to provide the current required for primary circuits such as, for example, those of the engine starter, the ignition system and the main lights and the other being adapted to provide the current required for secondary circuits such as those, for example, of radios, windshield and other heating devices, cigarette lighters and auxiliary lights of various kinds. The system has the advantage that the power circuits of those electrical devices which are desirable from a standpoint of comfort but which are not essential to the operation of the automobile are not, under normal conditions, permitted to draw energy from the main battery. The secondary circuits, therefore, do not cause an excessive drain upon the main battery and the latter is always available for supplying current to the main circuits, the use of primary and auxiliary batteries in the manner described having the further advantage that an adequate supply of current is available at all times while the possibility of the charge of either of the batteries being reduced below a safe value is minimized.

One object of the invention is to provide a system of the character generally described in which the current generating means is available for charging each battery at a rate determined by its average load, it being understood in this connection that the loads represented by the primary and secondary circuits will, in most cases, vary and that such variations may be compensated by adjusting the current generating means to vary correspondingly the charging rates of the batteries.

A further object is to provide a system in which the batteries are so arranged that interference between the primary and secondary circuits is prevented or minimized, this having the advantage that a radio may be included in one of the secondary circuits and the noise which would otherwise result from the spark plugs is prevented to a substantial degree without the necessity of employing suppressors or their equivalent.

A still further object is to provide a system in which either battery is available, at will, as a substitute for the other in the event that the necessity for this should arise.

A still further object is to provide a generator which will enable attainment of the objects above noted.

The invention is illustrated in the accompanying drawings, in which:

Figure 1 is a diagrammatic view illustrating a system embodying features of the invention.

Figure 2 is a front elevation of the engine shown in Figure 1 and illustrates a conventional drive for the generator.

Figure 3 is an enlarged detail section taken along line 3—3 of Figure 1.

Figure 4 is a vertical section taken along line 4—4 of Figure 3.

Figure 5 is a similar section taken along line 5—5 of Figure 3.

Figure 6 is a detail section through one of the brush holders of the generator and is taken along line 6—6 of Figure 3.

Figures 7 and 8 are diagrammatic views illustrating the field windings and brush arrangements of the armatures of the generator.

The system is illustrated in Figure 1 in connection with an automobile which is sufficiently indicated, for the purpose in view, by a showing of its chassis 10. The latter includes an engine 11 having spark plugs 12 which are connected to a distributor 13 by wires 14. The central terminal of the distributor is connected by a wire 15 to one end of the secondary winding of an ignition coil 16, the other end of the said winding being grounded. Electric current is supplied to the primary winding of the ignition coil from a main battery 21. One terminal 22 of the latter is grounded to the chassis as indicated at 23, the other terminal 24 being connected by a wire 25 to a blade 26 of a double-pole double-throw switch 27. When the said switch occupies the position illustrated, the blade 26 engages a terminal 29. The latter is connected by wires 30 and 30a to one side of the primary winding of the ignition coil, the other side of the said winding being connected by a wire 17 to one terminal of an ignition switch 18. The other terminal of the said switch is connected by a wire 19 to the fixed contact of the current interrupter of the distributor, the co-operating movable contact being grounded. In this connection it is understood, of course, that the wiring of the ignition system described is conventional and hence is sufficiently illustrated, for the purpose in view, by a showing of the exposed wires.

The headlights of the automobile, which are indicated at 31, are also included in a primary circuit. To this end they are connected by wires 32 to a junction box 33. The latter is connected by a wire 34 to the power terminal of a switch 35, the said switch being connected to, and being in parallel with, the wire 30 and hence being operable to connect the headlights to the main battery 21.

The engine starter is indicated at 36. It is preferably included in a primary circuit. For this purpose one side of the starter motor is grounded to the chassis as in conventional practice. The other side is connected by a wire 37 to a normally open main starter switch 38, the other side of the said switch being connected to the wire 30. Current for the starting motor is, therefore, provided by the main battery 21.

In accordance with the invention an auxiliary battery 39 is utilized as a source of power for operating those electrical devices which, while not essential to the operation of the automobile, provide for the comfort of the occupants of the vehicle and eliminate many of the hazards of driving. Devices of this character include, for example, radios, windshield and other heating devices, windshield wipers, cigarette lighters and auxiliary lights of various kinds. In the embodiment illustrated, a radio receiving set is indicated generally at 40, it being understood in this connection that the illustration is by way of example only and that the invention contemplates the use of the auxiliary battery as a source of power not only for those devices above noted but also for any other devices which may be employed.

The radio set 40 is indicated sufficiently by a showing of its casing 41, antenna 42 and the panel 43 which carries the tuning controls 44 and the switch 45. The power line for the radio is indicated at 46 and is connected to a wire 47, the said wire being connected to a wire 48 which is connected at one end to a terminal 59 of the switch 27 and at its opposite end to one side of an auxiliary starter switch 50. The other side of the switch 50 is connected to the wire 37. The terminal 49 is connected by a blade 51 of the switch 27 (when the switch is in the position illustrated) and a wire 49a to one terminal 52 of the auxiliary battery 39, the other terminal 53 of the said battery being grounded to the chassis of the vehicle. It will be apparent, therefore, that the battery 39 is not only adapted to supply current for the radio set 40 but is also available, in an emergency, to provide an additional source of power for the starter motor 36, it being noted that the main and auxiliary starter switches 38 and 50 may be operated independently or in unison to connect the respective batteries either individually or in parallel in the circuit of the engine starter. The switch 27 includes terminals 54 and 55 which are connected in conventional manner to the terminals 29 and 49, respectively. It may, therefore, be operated to interchange the main and auxiliary batteries, it being understood that in such a case the substitution of the batteries for one another is intended to be more or less permanent and that the operator continues to use the main starter switch in starting the engine.

In accordance with the invention means is provided, whereby the main and auxiliary batteries may each be charged at a rate which will enable it to carry the load represented by the circuits associated with it. The said means comprises a generator 55 having a casing 56. Dual armatures 57 and 58 and companion commutators 57a and 58a, respectively, are mounted in the casing upon a common shaft 59. The latter is journaled at its opposite ends in suitable bearings 60 which are carried by the ends of the casing and at its forward end it carries a pulley 61. The latter is driven in conventional manner by a belt 62 which, in the embodiment illustrated, passes around a drive pulley 63 carried by the crank shaft of the engine and a pulley 64 which serves to drive the cooling fan of the engine.

A set of field coils is associated with each of the armatures 57 and 58, those associated with the former being indicated at 66, 67, 68 and 69 (the coil 69 being shown in section) and those associated with the latter being indicated at 70, 71, 72 and 73. The field coils of each set cooperate with suitable pole pieces 74 which are carried by the casing 56 and they are connected in series in conventional manner, the set of field coils associated with the armature 57 being connected at one end to a brush 75 which co-operates with the commutator 57a and being grounded at its opposite end to the casing as indicated at 76 while the set of coils associated with the armature 58 is connected at one end to a brush 77 which co-operates with the commutator 58a and is grounded at its opposite end to the casing as indicated at 78. Brushes 79 and 80 are associated with the brush 75, the former being connected by a wire 81 to a power terminal 82 which is carried by the casing 56 and the latter being grounded to the casing as indicated at 83. Similar brushes 84 and 85 are associated with the brush 77, the former being connected by a wire 86 to a power terminal 87 which is carried by the casing 56 and the latter being grounded to the casing as indicated at 88. The brushes are of conventional design and they may be mounted for adjustment in accordance with present practice.

It is to be noted that the armatures 57 and 58, together with their associated commutators, are similar units, that is to say they are interchangeable. As they are secured upon the shaft 59 in back-to-back relation, the brushes 75 and 77 are inverted with respect to one another in order that current will be generated by the movement of each armature as the shaft 59 is rotated by the engine. In other words by inverting the brushes 75 and 77 relatively to one another the inversion of the armatures is compensated, thereby enabling the use of similarly wound armatures for both sections of the generator. The construction described has the further advantage that facility in removing the armatures, for inspection, repair or replacement is facilitated, it being apparent, for example, that by first removing the pulley 61 and the end of the casing remote from said pulley and by disconnecting at the same end the field coil leads and the lead connecting the power terminal to its brush, the entire assembly including the armatures 57 and 58 and the shaft 59 may be withdrawn from the casing as a unit.

The current generated by the movement of the armature 57 is utilized to charge the main battery 21. To this end the wire 30 is connected to the power terminal 82 of the generator, a cut-out 89 serving to keep the charging circuit open until the engine reaches a predetermined speed. The current generated by the movement of the armature 58 is utilized to charge the auxiliary battery 39 and for this purpose the wire 47 is connected to the power terminal 87 of the generator, a cut-out 90 being included in the charging circuit and being adapted to keep the said circuit open until a predetermined engine speed has been attained.

From the foregoing it will be apparent that the brushes of the generator may be adjusted so that each battery is charged at a predetermined rate corresponding to its average load, the load upon the batteries, of course, depending upon the requirements of the associated circuits. The brushes of the generator may, for example, be adjusted so that the normal charging rate of the main battery will be of the order of ten amperes while that of the auxiliary battery will be of the order of fifteen amperes. In other words the charging rates are variable to meet the requirements of each battery, suitable ammeters 91 and 92 (Figure 1) serving to indicate the rates at which the generator is charging the batteries.

The system described has the advantage that it is capable of carrying relatively heavy loads, the generator being available to charge one of the batteries at a high rate relative to the other in the event that its load is correspondingly greater or its charge falls below the desired value. If, for any reason, the charge of the auxiliary battery becomes dissipated the secondary circuits, being independent of the main circuits, will not drain the primary battery. In other words the main battery serves only those circuits essential to the safe operation of the vehicle. Hence the possibility of its charge falling below the desired predetermined value is minimized. However, should this occur the auxiliary battery is available either as a temporary or a permanent substitute.

I claim as my invention:

In an electric current supply system for the engine and associated electrical devices of an automobile, said system having a primary circuit for supplying power to those devices essential to the operation of the automobile and including a starting motor for said engine and a secondary circuit for supplying power to those of said devices which are intended to add to the comfort of the occupants of the automobile, the combination of a main battery for supplying power to the devices included in said primary circuit, an auxiliary battery for supplying power to the devices included in said secondary circuit, means for connecting said starting motor to either of said batteries, a common generator for charging said batteries, said generator having a shaft which is driven by said engine, an armature carried by said shaft and being divided into primary and secondary sections, a set of field coils associated with each of said armature sections, means for utilizing substantially all of the current generated by the movement of the primary armature section for charging said main battery, means for utilizing substantially all of the current generated by the movement of the secondary armature section for charging said auxiliary battery and means whereby said generator may be adjusted so that the charging rate of each battery may be varied independently of the other and in accordance with the load represented by the electrical devices of the associated circuit.

CHARLES B. SCHMIDT.